(12) United States Patent
Oakshott et al.

(10) Patent No.: US 11,376,988 B2
(45) Date of Patent: Jul. 5, 2022

(54) METHOD AND APPARATUS FOR MODULAR CHARGING STATION

(71) Applicant: RENEWABLE CHARGING SOLUTIONS, LLC, Scottsdale, AZ (US)

(72) Inventors: Neil Oakshott, Wednesbury (GB); Mark Cavanaugh, Scottsdale, AZ (US); Joseph Vrabel, Chapel Hill, NC (US)

(73) Assignee: Renewable Charging Solutions, LLC, Scottsdale, AZ (US)

( * ) Notice: Subject to any disclaimer, the term of this patent is extended or adjusted under 35 U.S.C. 154(b) by 269 days.

(21) Appl. No.: 16/829,718

(22) Filed: Mar. 25, 2020

(65) Prior Publication Data

US 2020/0307408 A1     Oct. 1, 2020

Related U.S. Application Data

(60) Provisional application No. 62/823,781, filed on Mar. 26, 2019.

(51) Int. Cl.
*H02J 7/00*       (2006.01)
*H02J 7/14*       (2006.01)
*B60L 53/68*      (2019.01)
*B60L 53/53*      (2019.01)
*B60L 53/30*      (2019.01)
(Continued)

(52) U.S. Cl.
CPC ............... *B60L 53/68* (2019.02); *B60L 53/30* (2019.02); *B60L 53/51* (2019.02); *B60L 53/52* (2019.02); *B60L 53/53* (2019.02)

(58) Field of Classification Search
USPC ........................................ 320/134, 104, 107
See application file for complete search history.

(56) References Cited

U.S. PATENT DOCUMENTS 8,054,048 B2   11/2011   Woody et al.
8,294,286 B2   10/2012   Hunter
(Continued)

FOREIGN PATENT DOCUMENTS

CN      101938146 A       1/2011
WO      2011156776 A2    12/2011
WO      2012012021 A1     1/2012

*Primary Examiner* — Alexis B Pacheco
(74) *Attorney, Agent, or Firm* — Noblitt & Newson, PLLC (57) ABSTRACT

A modular and portable charging station according to various aspects of the present technology may include a main chassis body that is fully assembled at one location and then transferred as a whole to a desired location and placed into operation without the need for significant site modification, or connection to the electric power grid. The interior of the main chassis body may contain one or more removable charging stations and at least one removable battery bank. The battery bank provides each charging station with electrical power to charge a vehicle battery system. The portable charging station may comprise its own onboard power supply configured to use renewable sources to maintain a charge to the battery bank. The portable charging station may also be configured to be connected to a local power source that is connected to the local power grid. A power management system monitors the charge level of the battery bank and is able to select an appropriate method of recharge.

20 Claims, 7 Drawing Sheets

(51) Int. Cl.
*B60L 53/51* (2019.01)
*B60L 53/52* (2019.01)

(56) References Cited

U.S. PATENT DOCUMENTS

| | | |
|---|---|---|
| 8,324,859 B2 | 12/2012 | Rossi |
| 8,792,227 B2 | 7/2014 | Prax et al. |
| 8,963,481 B2 | 2/2015 | Prosser et al. |
| 9,153,847 B2 | 10/2015 | Harty |
| 9,209,648 B2 | 12/2015 | Wheatley et al. |
| 10,078,856 B2 | 9/2018 | Gharabegian |
| 2009/0043520 A1 | 2/2009 | Pollack et al. |
| 2010/0060016 A1 | 3/2010 | Hunter |
| 2010/0277121 A1 | 11/2010 | Hall et al. |
| 2013/0069592 A1 | 3/2013 | Bouman |
| 2013/0127417 A1 | 5/2013 | Karner et al. |
| 2013/0218356 A1 | 8/2013 | Lee et al. |
| 2014/0347873 A1 | 11/2014 | Robertson et al. |
| 2017/0106764 A1 | 4/2017 | Beaston et al. |
| 2017/0274792 A1* | 9/2017 | Vaughan ................. B60L 53/68 |
| 2017/0361727 A1* | 12/2017 | Miftakhov ............ H02J 7/0013 |
| 2018/0001781 A1* | 1/2018 | Quattrini, Jr. ......... B60L 53/665 |
| 2018/0162229 A1 | 6/2018 | Gotz et al. |
| 2018/0244170 A1* | 8/2018 | Kydd ...................... H02S 40/38 |
| 2019/0061546 A1* | 2/2019 | Miftakhov ................ H02J 3/38 |
| 2020/0254887 A1* | 8/2020 | Robert ................... B60L 50/64 |

* cited by examiner

METHOD AND APPARATUS FOR MODULAR CHARGING STATION

CROSS-REFERENCES TO RELATED APPLICATIONS

This application claims the benefit of U.S. Provisional Patent Application No. 62/823,781, filed Mar. 26, 2019, and incorporates the disclosure of the application by reference.

BACKGROUND OF THE TECHNOLOGY

As sales of electric vehicles increase, the need for a reliable infrastructure system to support these vehicles also increases. At the forefront of this need is a network of publicly available battery charging stations. At present, public charging stations are extremely limited and may not be operational with all types of vehicles or cable interconnects. For example, some manufacturers produce vehicles with non-standard connectors that may limit where or how the vehicle can be charged or the type of charger that can be used.

Current public charging stations also require substantial effort to install. These charging systems have to be connected to a local electrical source tied in to the local power grid. While it may be less costly or intrusive to incorporate a charging station into a new construction project, installing a charging station at an existing structure often requires significant modifications to these structures. The result is that newly installed charging stations cannot easily be located at existing locations.

SUMMARY OF THE TECHNOLOGY

A modular and portable charging station according to various aspects of the present technology may include a main chassis body that is fully assembled at one location and then transferred as a whole to a desired location and placed into operation without the need for significant site modification, or connection to the electric power grid. The interior of the main chassis body may contain one or more removable charging stations and at least one removable battery bank. The battery bank provides each charging station with electrical power to charge a vehicle battery system. The portable charging station may comprise its own onboard power supply configured to use renewable sources to maintain a charge to the battery bank. The portable charging station may also be configured to be connected to a local power source that is connected to the local power grid. A power management system monitors the charge level of the battery bank and is able to select an appropriate method of recharge.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of computing platforms, power generating and storage systems, electrical circuits, and communication systems, which may carry out a variety of operations suited to recharging vehicle battery systems. In addition, the technology described is merely one exemplary application for the invention. Further, the present technology may employ any number of conventional techniques for generating and storing electricity, charging batteries, managing charging stations, and processing payment information.

Methods and apparatus for a modular charging station according to various aspects of the present technology may operate in conjunction with any type of power grid system, renewable power generation system, or electrically powered vehicle. Various representative implementations of the present technology may be applied to any system for charging battery systems used on vehicles, aircraft, boats, and/or the general storage of electrical power.

Figure 1:
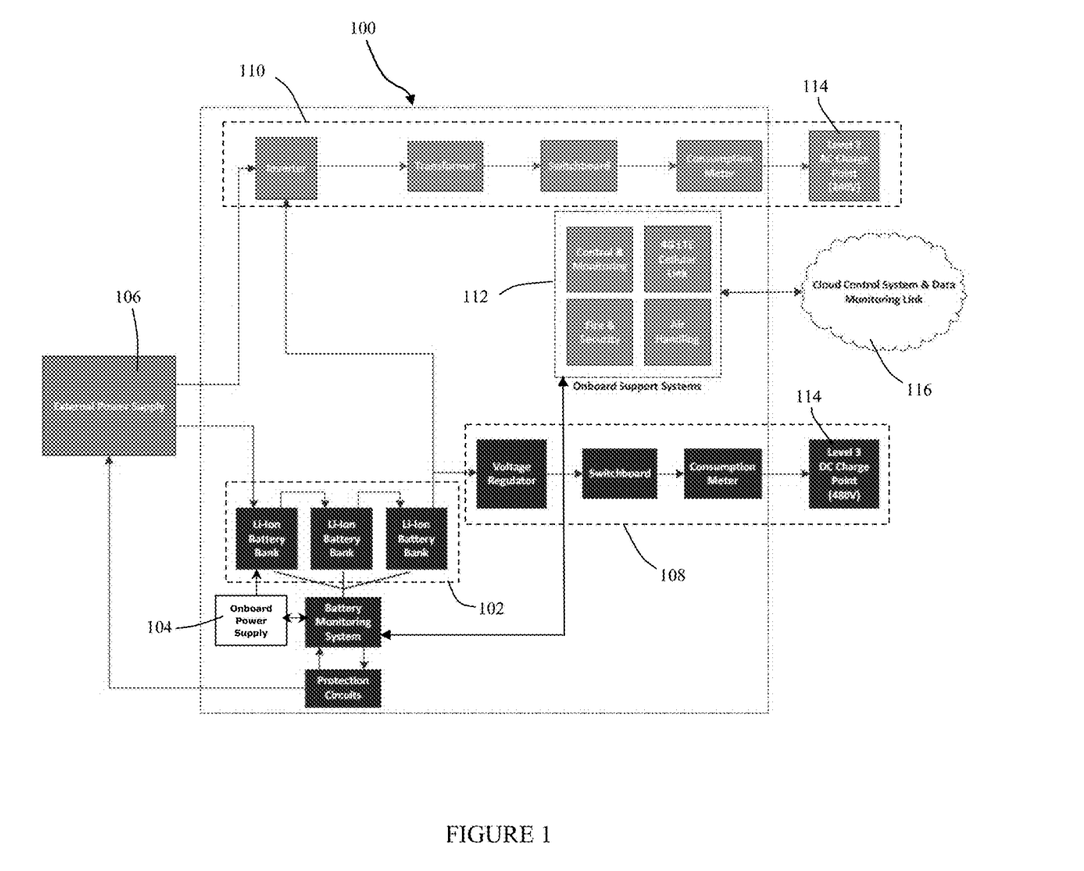
FIG. 1 representatively illustrates a block diagram of a modular charging system in accordance with an exemplary embodiment of the present technology.
Figure 2:
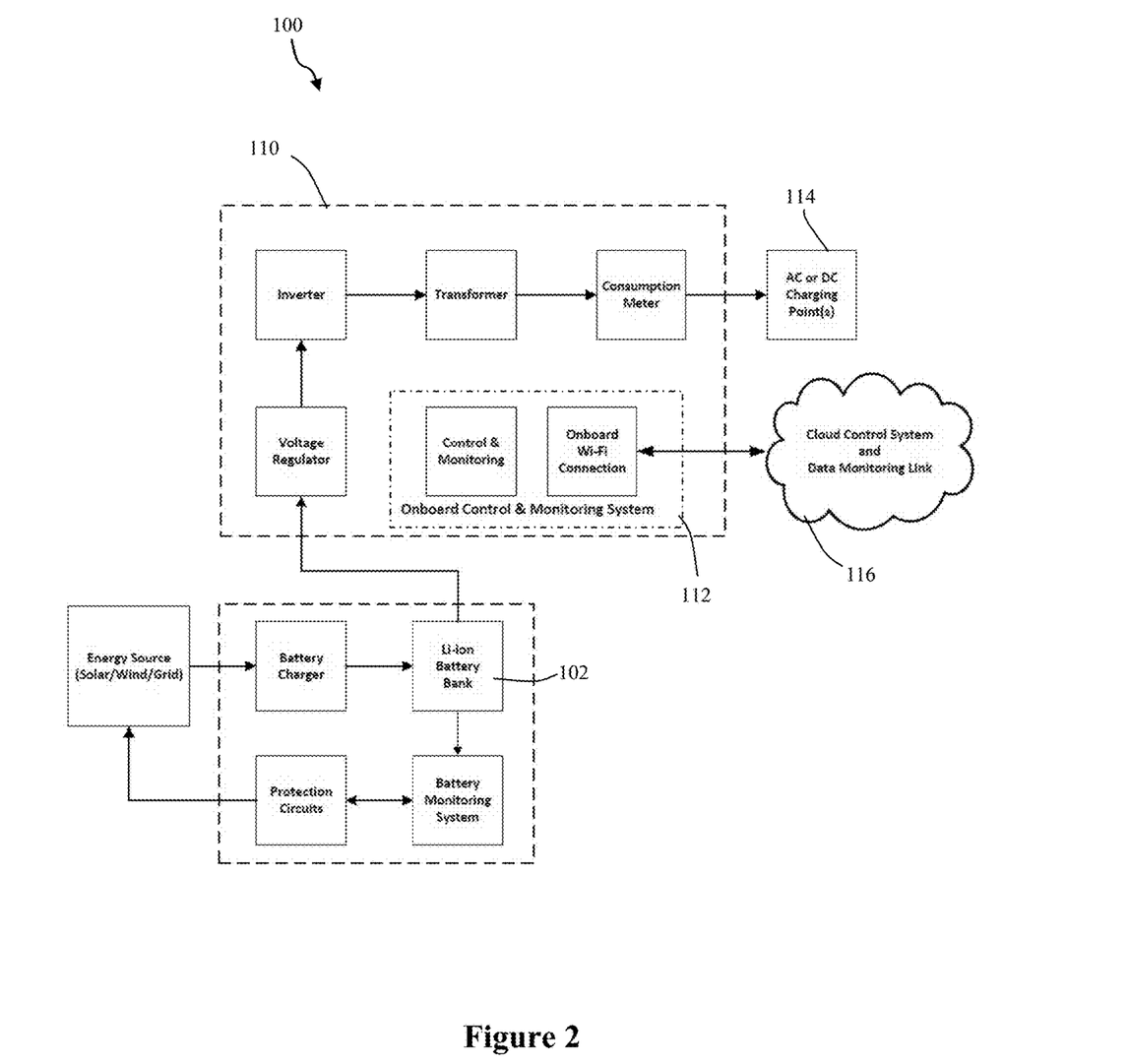
FIG. 2 representatively illustrates a block diagram of a modified modular charging system in accordance with an exemplary embodiment of the present technology.
Figure 3:
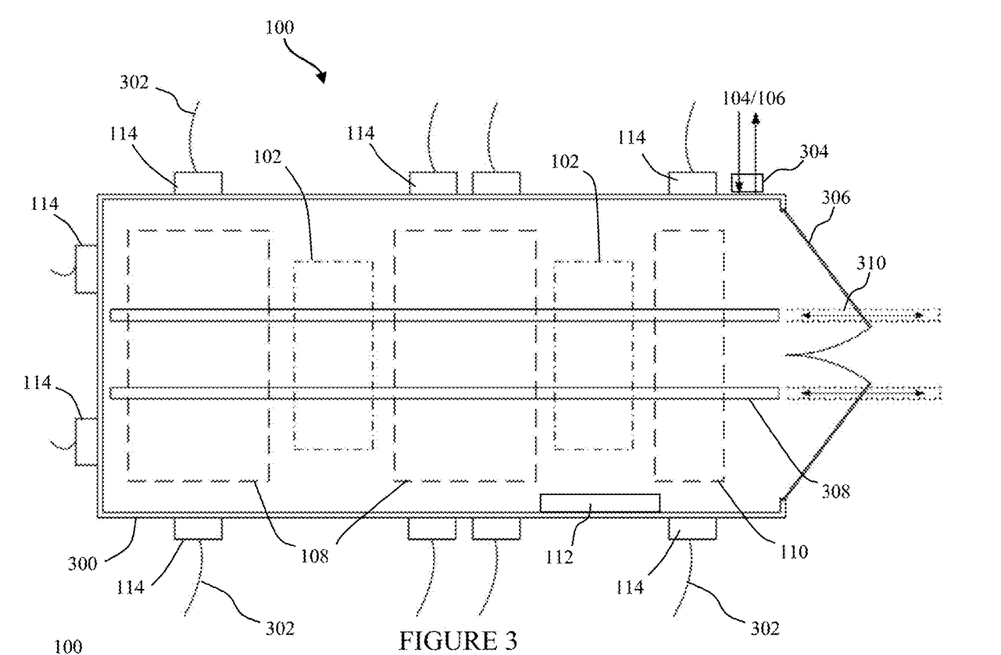
FIG. 3 representatively illustrates an internal layout configuration of a modular charging system in accordance with an exemplary embodiment of the present technology.

Referring to FIGS. 1 and 2, the modular charging station 100 may comprise a main chassis body configured to contain a power storage system 102, at least one charging station 108, 110, and a power management system 112 within an interior volume of the main chassis body. The modular charging station 100 may further comprise an onboard power supply 104 that is electrically connected to the power storage system 102 and the power management system 112.

Each charging station 108, 110 may comprise or be connected to a charging station interface 114 that is accessible from outside of the main chassis body.

The modular charging station 100 is configured to be portable and may be fully assembled and placed into operational readiness in one location and transported to a second location where it can be deployed into operation with minimal local infrastructure modification, site preparation, or necessary construction. The modular charging station 100 may also be transported to a third location and placed into operation, again with minimal local infrastructure modification, site preparation, or necessary construction. For example, in one embodiment, the modular charging station 100 may comprise a fully self-contained and functional charging station that can be moved by truck to a desired operating location, positioned, and immediately placed into service without having to be connected to an electric power grid (i.e. off-grid installation). In another embodiment, the modular charging station 100 may comprise a fully self-contained and functional charging station that can be moved by truck to a desired operating location, positioned, and placed into service after being connected to a preexisting external power source 106, such as being wired to a power source or being plugged into an existing power outlet. The external electrical power source 106 may comprise an on-site renewable power source or a connection to the local electric grid.

The modular charging station 100 may be sized for operation in locations having limited space available. For example, the modular charging station 100 may be configured to be positioned at or near an existing parking location, such as adjacent to a series of parking spots/bays in a preexisting parking lot. Alternatively, the modular charging station 100 may be sized to fit within a single parking spot/bay such that the modular charging station 100 can be operated in an existing parking lot allowing vehicles using the modular charging station 100 to park in the adjacent spots/bays while charging.

Referring now to FIGS. 3-6, the main chassis body 300 may be configured to house or otherwise enclose one or more charging stations 108, 110, the power storage system 102, the power management system 112, and a heating/cooling system (not shown). An input power terminal 304 may be used to connect the power storage system 102 to the incoming power supply from the onboard power supply 104 and/or the external electrical power source 106. The power storage system 102 is used to provide electrical current to the charging stations 108, 110 to charge the battery system of one or more vehicles 500 and provide power to control systems and accessories installed in the modular charging station 100.

The main chassis body 300 may comprise at least one set of access doors 306 that provide access to the interior volume and any components located within. A floor of the main chassis body 300 may configured with at least one set of tracks or rails 308 that allow the charging stations 108, 110, the power storage system 102, and/or the power management system 112 to be positioned in place for use and removed from the interior volume for maintenance. For example, and with particular reference to FIG. 3, the main chassis body 300 may comprise a single set of access doors 306 positioned at an end of the structure and a single set of rails. The rails may be fixed in position and configured to allow the charging stations 108, 110 and the power storage system 102 to slide or roll along the rails. Alternatively, the rails may comprise a slidable track 310 that is configured to extend outwardly through the access doors 306 while keeping the charging stations 108, 110 and the power storage system 102 fixed to the slidable track 310.

Figure 4:
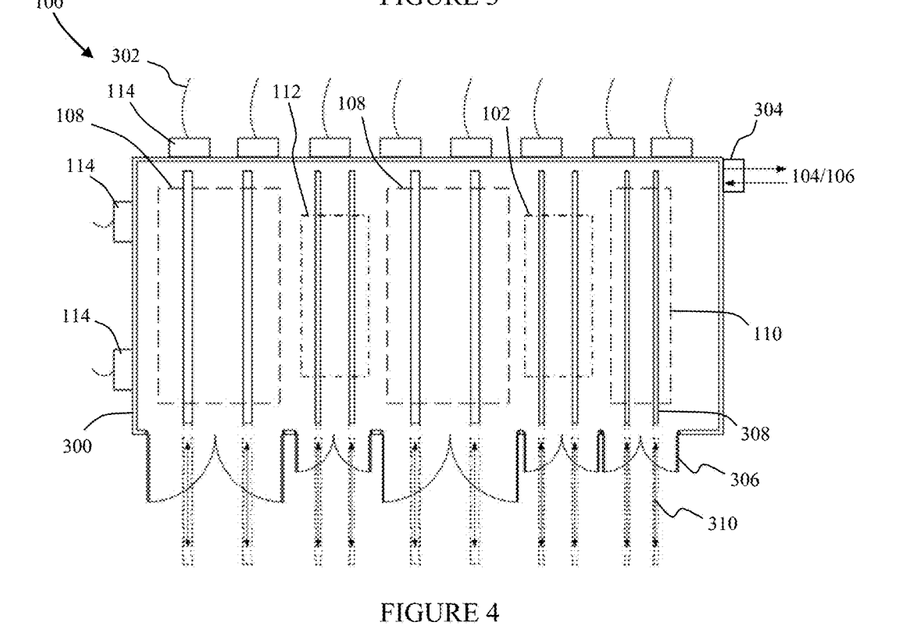
FIG. 4 representatively illustrates an alternative internal layout configuration of a modular charging system in accordance with an exemplary embodiment of the present technology.
Figure 5:
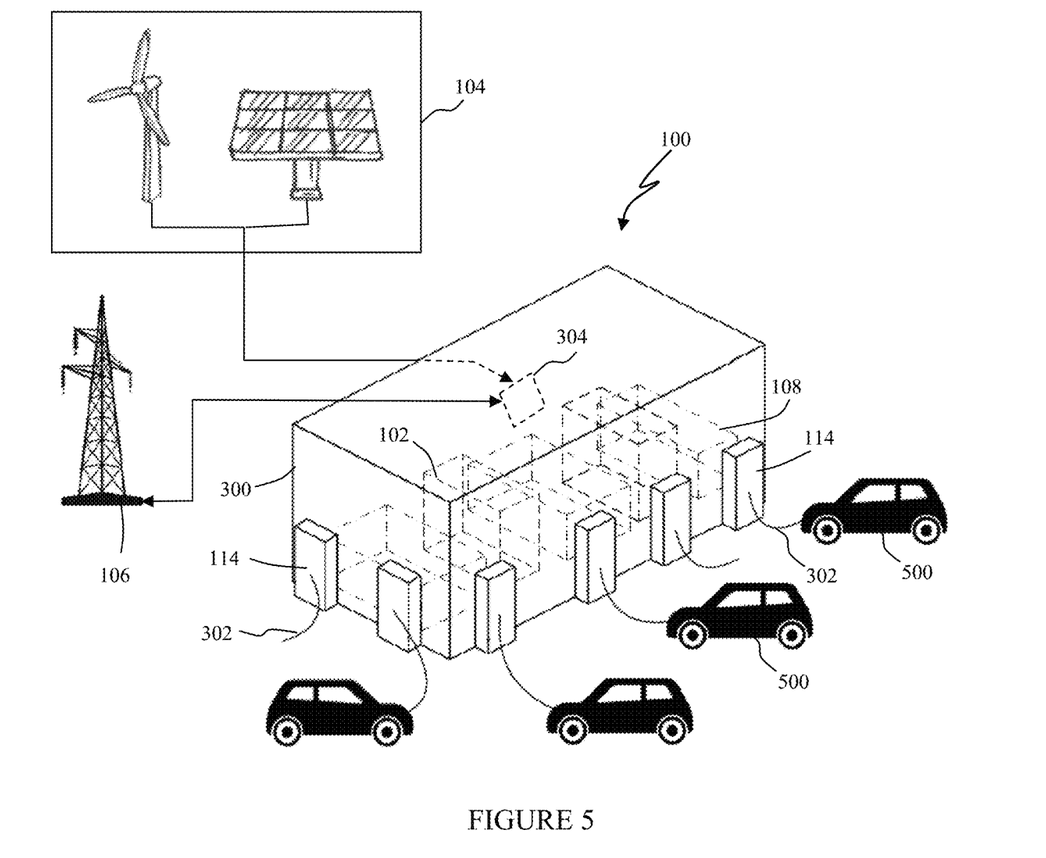
FIG. 5 representatively illustrates a modular charging system for multiple vehicles in accordance with an exemplary embodiment of the present technology.
Figure 6:
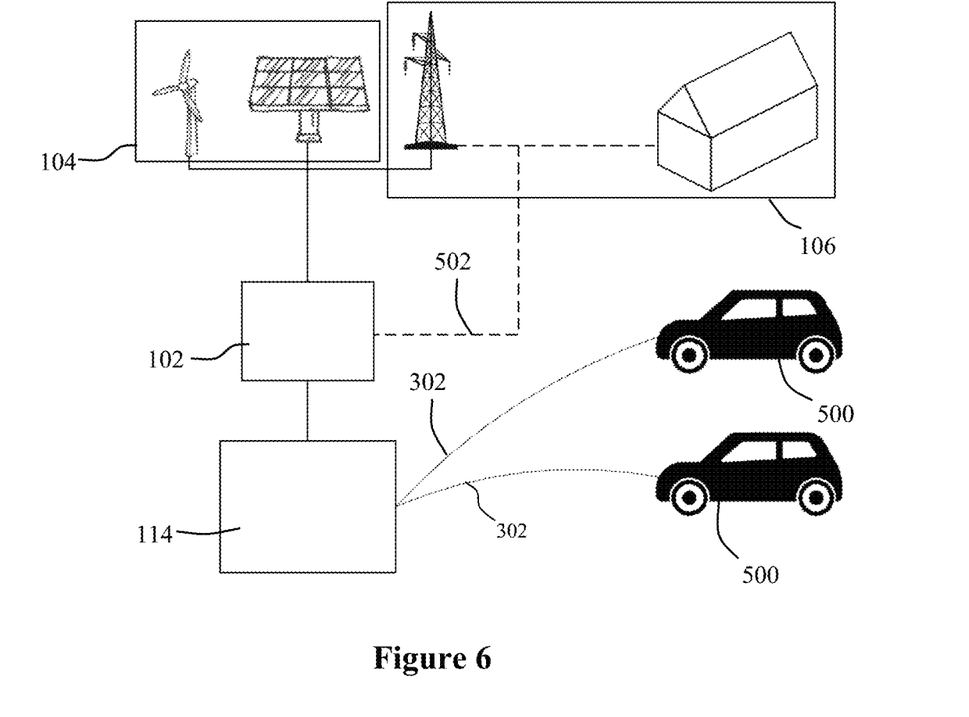
FIG. 6 representatively illustrates an alternative embodiment of modular charging system for multiple vehicles in accordance with an exemplary embodiment of the present technology.

In an alternative embodiment, and referring now to FIG. 4, the main chassis body 300 may comprise a set of access doors 306 and a set of rails 308 for each component enclosed within the main chassis body 300 such that an individual charging station 108, 110, power storage system 102, or power management system 112 may be installed or removed from the main chassis body 300 without requiring the removal of any other components. As above, the rails may be fixed in position and configured to allow the movable components to slide or roll along the corresponding rail or the rails may each comprise a slidable track 310 that is configured to extend outwardly through the access doors 306 while keeping the movable components fixed to the slidable track 310.

Each charging station interface 114 may be positioned along an exterior surface of the main chassis body 300 and be suitably configured to allow a user to interact with the modular charging station 100 to charge their vehicle 500. For example, the charging station interface 114 may comprise a control panel or screen adapted to present the user with one or more options for charging their vehicle 500. For example, the screen may allow a user to make appropriate selections to charge their vehicle 500, check the status of an ongoing charge, access a user account, or the like. The charging station interface 114 may also comprise a point of sale (POS) terminal that allows users to provide a payment method if the modular charging station 100 requires a fee to provide charging capability to a vehicle 500.

One or more charging cables 302 may be positioned at each charging station interface 114 and extend outward from the main chassis body to allow the user to plug their vehicle into the modular charging station 100. The charging cables 302 may comprise multiple types of interconnects to allow the modular charging station 100 to be used with various types of vehicles 500.

Major components located within the main chassis body 300 may be positioned on movable sub-chassis assemblies that are configured to be removably positioned within the interior volume. The sub-chassis provided additional modularity by allowing for increased ease of maintenance. For example, if one component requires maintenance the entire sub-chassis may be repositioned from the interior of the main chassis body 300 and serviced outside of the interior volume. Removing a single sub-chassis may also allow the modular charging station 300 to continue to function without being taken offline.

Each sub-chassis may comprise any suitable structure or device to allow for installation and removal from the main chassis body 300. For example, each sub-chassis may comprise a skid, track, or wheel assembly that is configured to slide or roll along the tracks or rails 308 on the floor of the main chassis body 300. Alternatively, each sub-chassis may be mounted onto a slidable track 310 such that the sub-chassis is fixed to the slidable track 310 but can be easily slid outward from the interior of the main chassis body 300.

Figure 7:
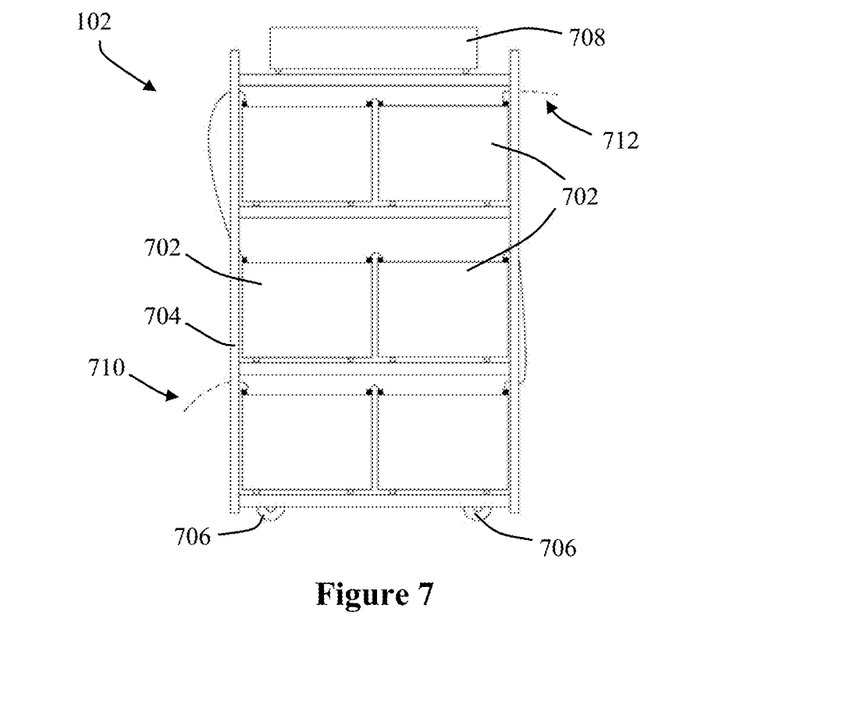
FIG. 7 representatively illustrates a side view of a battery bank in accordance with an exemplary embodiment of the present technology.
Figure 8:
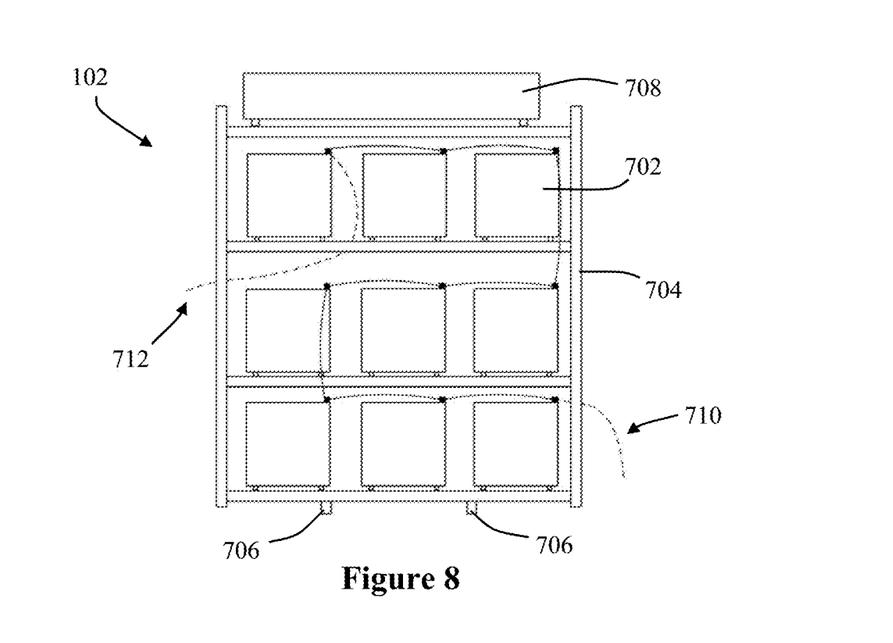
FIG. 8 representatively illustrates an end view of the battery bank in accordance with an exemplary embodiment of the present technology.

Referring now to FIGS. 7 and 8, the modular charging station 100 comprises a power storage system 102. The power storage system 102 may comprise any suitable device or system for providing a charging capability to the modular charging station 100, For example, the power storage system 102 may comprise one or more rechargeable batteries 702 arranged into a battery bank and positioned on a battery sub-chassis 704. Individual batteries 702 may comprise any suitable type of battery or system for storing power than can be used to charge another battery system such as that used in fully electric or hybrid vehicles such as: solid-state lithium-ion; sodium-ion; lithium-polymer; graphene; and the like. In one embodiment, the battery bank may comprise a plurality of lithium-ion batteries coupled together to store sufficient power to simultaneously charge a desired number of vehicles connected to the modular charging station 100. For example, the power storage system 102 may be sized to allow the simultaneous charging of up to fourteen vehicle battery systems. The power storage system 102 may also utilize any other additional source of power or technology to store electricity such as hydrogen fuel cells, liquid metal batteries, metal-free flow batteries, and the like.

The battery bank may include a power input 710 that is connected to the input power terminal 304 and a power output 712 that is connected to a charging station 108, 110. Individual batteries 702 may be connected together between the power input 710 and the power output 712 to form the battery bank. The batteries 702 may connected in any suitable manner such as in series, in parallel, or in some combination of both. The power input 710 and the power output 712 may be configured with a connector system that allows for easy connection and disconnection to facilitate removal of the battery sub-chassis 704 from the main chassis body 300.

The battery sub-chassis 704 may comprise a controller unit 708 that is configured to monitor the status of the batteries 702 and is in communication with the power management system 112. For example, the controller unit 708 may be configured to monitor any desired factors such as the charge level of the battery bank, a rate of discharge or recharge, usage metrics, temperature of the batteries 702, or any other suitable criteria and communication that data to the power management system 112. The controller unit 708 may also include a protection circuit that generates a fault signal if a problem with one or more batteries is detected. The fault signal may be communicated to the power management system 112 for appropriate action, such as being taken offline to avoid additional faults or to signal that maintenance is required. Further, the controller unit 708 may be configured to take appropriate action, based on the generated fault signal.

In one embodiment, the battery sub-chassis 704 may comprise a set of wheels 706 that are configured to engage the tracks or rails 308 to allow the battery sub-chassis 704 to be rolled out through the access doors 306. In an alternative embodiment, the battery sub-chassis 704 may comprise a skid (not shown) that is configured to slide along the tracks or rails 308. In yet another embodiment, the battery sub-chassis 704 may be mounted onto a slidable track 310 that is configured to extend outwardly through the access doors 306.

Figure 9:
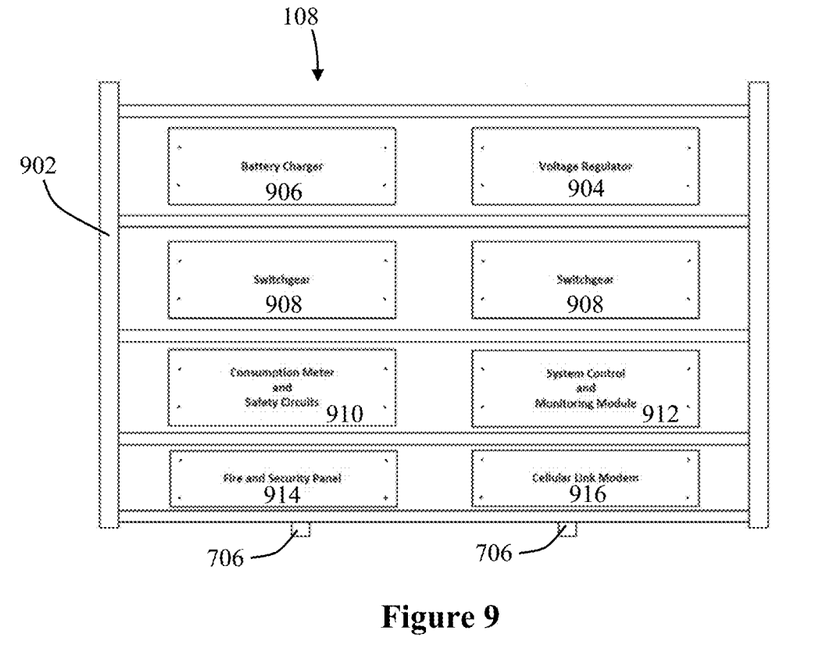
FIG. 9 representatively illustrates a first recharge station in accordance with an exemplary embodiment of the present technology.
Figure 10:
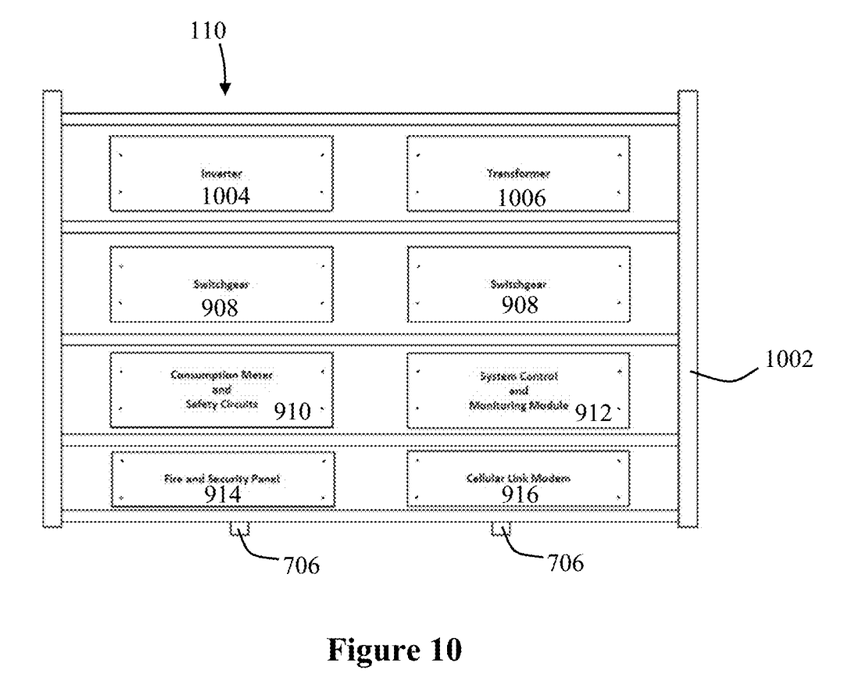
FIG. 10 representatively illustrates a second recharge station in accordance with an exemplary embodiment of the present technology.

Referring now to FIGS. 9 and 10, individual charging stations 108, 110 of the modular charging station 100 may be configured to provide one or more methods of recharge capability. For example, the modular charging station 100 may be configured to provide one or more rapid charging connections for battery systems that are designed to be recharged using this method and one or more slower charging connections for other types of battery systems.

Referring now to FIG. 9, in one embodiment a first recharge station 108 may comprise a Level 2 or Level 3 recharge station that is configured to recharge a vehicle battery system using direct current (DC). The first recharge system 108 may comprise any suitable components such as a voltage regulator 904 and a battery charger unit 906. The first recharge station 108 may be configured to provide any suitable type of DC charge capability such as a 240-volt or a 208-volt power level or a DC fast charge.

Referring now to FIG. 10, in one embodiment a second recharge station 110 may comprise a Level 1 charging station that is configured to recharge a vehicle battery system using alternating current (AC). The second recharge system 110 may comprise any suitable components to provide charging such as an inverter 1004 and a transformer 1006. The second recharge station 110 may be configured to operate on either 120 VAC/60 Hz or 230 VAC/50 Hz.

With reference to FIGS. 9 and 10, each type of recharge station 108, 110 may also comprise additional components that allow the recharge stations 108, 110 to function and communicate with the power management system 112 such as a switchgear 908, a metering circuit 910, power management interface 912, fire control device 914, and a modem 916 for communication. Each individual charging station 108, 110 may be positioned on a sub-chassis 902, 1002 that is similarly configured as described above with respect to the battery sub-chassis 704 to allow for ease of removal and installation from the main chassis body 300. The charging stations 108, 110 may also include interconnecting devices (not shown) to allow the charging stations 108, 110 to be connected to the power storage system, 102, a corresponding charging station interface 114, and the power management system 112.

The charging stations 108, 110 may also be configured to provide charging capability to more than one vehicle at a time. For example, a single charging station 108, 110 may be configured to provide simultaneous charging to two different charging cables 302 to allow for dual vehicle charging. In a residential setting or a public location where space is at a premium dual vehicle charging allows two vehicles to be charged at the same time from a single recharge station 108, 110 in contrast to prior art systems that only provide single charge capability.

The modular charging station 100 may be configured to charge the power storage system 102 or otherwise maintain a predetermined charge level in the power storage system 102 by any suitable device or system. In one embodiment, the modular charging station 100 may comprise an onboard power supply 104 that is configured to provide a recharge source to the power storage system 102. For example, the onboard power supply 104 may comprise one or more renewable power generating systems such as a solar array or wind turbine.

For example, one or more solar panels may be installed on an outer surface of the main chassis body 300 to provide a charging source during daylight hours. Similarly, one or more vertically oriented wind turbines may also be connected to the modular charging station 100 to provide a charging source that is able to operate at all times of the day. Any other known or currently unknown sources of onboard power generation may also be incorporated to allow the modular charging station 100 at least some level of recharge capability that is not dependent on a traditional electric power grid. The onboard power supply 104 may also be used to supplement power from the electric grid during peak hours when electricity is most expensive.

The onboard power supply 104 may be connected to the main chassis body 300 by any suitable method or structure. For example, the wind turbine may be connected to a deployable arm that may be rotated or extended to an upright operational position after the modular charging station 100 has been positioned for use. Similarly, the solar panels may be installed on a deployable array along an upwardly facing exterior surface of the main chassis body 300. Alternatively, the onboard power supply 104 may comprise a detachable structure that is configured to be set up a short distance from the main chassis body 300.

The onboard power supply 104 provides generated electricity to the power storage system 102 through the input power terminal 304. For example, in one embodiment, the onboard power supply 104 may be plugged into the input power terminal 304 through a connection on the exterior of the main chassis body 300. Alternatively, the onboard power supply 104 may wired to the input power terminal 304 through an internal wiring positioned within the interior volume of the main chassis body 300.

The power management system 112 manages onboard systems and a user interface. The power management system 112 may comprise any suitable system or device for receiving and transmitting signals from the power storage system 102, the recharge stations 108, 110, the onboard power supply 104, the external power supply 106, the recharge station interface 114, and any remotely located systems such as a network server. The power management system 112 may be configured to monitor any desired factors such as: available charge level of the battery bank, estimated charge times for the battery bank or a connected vehicle 500, usage metrics over time, and main chassis body 300 environmental conditions. The power management system 112 may use any monitored factor to adjust, control, or otherwise manage various onboard systems. For example, if the temperature within the main chassis body 300 increases above a certain level, the power management system 112 may signal the heating/cooling system to cool the interior.

The power management system 112 may be positioned on a sub-chassis that is similarly configured as described above with respect to the other sub-chassis assemblies allow for ease of removal and installation from the main chassis body 300. Alternatively, the power management system 112 may be installed directly to the interior of the main chassis body 300 and not be part of the sub-chassis system used for the other interior components.

The power management system 112 may also be configured to be monitored or controlled remoted over a communication network 116. For example, power management system 112 may comprise a communication system configured to transmit and/or receive operational information from a remote system over a wireless communication network. The communication system may also be configured to provide a localized wireless 4G/5G/Wi-Fi hot spot for users while they are recharging their vehicle battery system.

If the modular charging station 100 is connected to an external power source 106 once installed, the power management system 112 may be configured to select the most cost-effective charging option available for a given time period. For example, the power management system 112 may comprise a cost model that includes factors such as on-peak and off-peak electric rates, current available power from the onboard power supply 104, available charge in the battery bank, and historic demand to determine whether or not the external power source 106 should be used to recharge the battery bank. The power management system 112 may also select a given charging option according to usage rate, the number of vehicles using the system, or any other suitable criteria.

The power management system 112 may further be configured to direct excess generated power from the onboard power supply 104 to a connected electric grid. For example, during times of low use the onboard power supply 104 may generate more electricity than is needed to charge the battery bank or any connected vehicles 500. When this occurs, the power management system 112 may send any excess electricity back through the input power terminal 304 to the electric grid or to a nearby structure. For example, excess generated electricity may be directed to a nearby business or residence.

During use, the power management system 112 may configured to provide distributed load sharing between all connected vehicles 500. For example, the power management system 112 may be configured to equalize charge capability among all recharge stations 108, 110 when multiple vehicles 500 are connected to the modular charging station 100 at the same time. This ensures that each vehicle 500 receives the same priority during use. This load balancing may be adjusted in real-time as vehicles are connected or disconnected from the modular recharge station 100 and the required load on the battery bank changes.

In an alternative embodiment, the power management system 112 may be programmed to recognize specific vehicles and assign certain vehicles a higher priority than other vehicles. Vehicles with a higher priority may be provided with a higher recharge rate than lower priority vehicles. For example, the power management system 112 in a specific modular recharge station 100 might be programmed to identify vehicles such as police cars, ambulances, or other emergency response vehicles and assign them a higher priority compared to regular vehicles; this would provide increased recharge capacity to the recharge station 108, 110 connected to the identified higher priority vehicle.

The modular charging station 100 may also comprise additional features selected to provide additional functionality to users or to provide enhanced operability to the modular charging station 100 itself. For example, individual charging points on the modular charging station 100 may include charging connections for personal electronics, exterior lighting systems, and an air supply system for vehicle tires. Additional features such as vending machines, an ATM machine, emergency call boxes, and payment terminals may also be incorporated into the modular charging station 100.

The modular charging station 100 may also include an integrated video monitoring system that is linked to the power management system 112. In addition to providing security features, the video monitoring system may be configured to facilitate billing procedures by utilizing a license plate reader to automatically identify a vehicle and determine if a user account is connected to that particular vehicle. If an account is identified, billing for the charge time may be automatically charged to the appropriate account without requiring any action from the user.

The main chassis body 300 of the modular charging station 100 may also be customizable by the end user/operator. For example, one or more exterior surfaces of the main chassis body 300 may be configured to allow the end user/operator to easily apply their corporate branding to the main chassis body 300. Similarly, the exterior surfaces of the main chassis body 300 may be used as advertisement space. Alternatively, one or more display screens may be affixed to the exterior surface of the main chassis body 300 to provide a digital display medium for displaying advertising or video broadcasts to users.

The modular charging station 100 may be configured to communication with an software application interface. The software application interface may comprise a mobile application software system ("App") configured to allow a portable computing device such as a smart phone, tablet computer, smart watch, or other like device to interact with the modular charging station 100. The App may allow users to communicate with the modular charging station 100 to during use. For example, a user may access the App on their portable computing device rather than the charging station interface 114. The user may be able to identify themselves or their vehicle prior to connecting the charging cable 302 to their vehicle 500.

The App may be configured to provide the power management system 112 access to the user's account for any suitable reason such as payment processing or to identify the type of vehicle the user has registered to their account. The App may also provide the user with indications or status updates on the level of charge the battery system of their vehicle 500 has obtained. The App may also provide indications of remaining time to full charge. The App may also provide the user with a location map of nearby modular charging stations and their availability.

These and other embodiments for methods for a modular charging station may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. A modular charging station, comprising:
   a main chassis body, comprising:
      a charging station interface positioned along an outer surface of the main chassis body; and
      an input power terminal;
   a charging station positioned on a first movable sub-chassis disposed within the main chassis body and electrically connected to the charging station interface;
   a battery bank positioned on a second movable sub-chassis disposed within the main chassis body and electrically connected to the input power terminal and the charging station; and
   a power management system disposed within the main chassis body and electrically connected to the charging station and the battery bank.

2. A modular charging station according to claim 1, further comprising a renewable power generation system connected to an outside surface of the main chassis body and electrically connected to the battery bank via the input power terminal.

3. A modular charging station according to claim 2, wherein the input power terminal is further configured to be connected to an electrical source connected to an electric power grid.

4. A modular charging station according to claim 3, wherein the power management system is configured to recharge the battery bank by selecting between the renewable power generation system and the electrical source connected to the electric power grid according to a cost model.

5. A modular charging station according to claim 2, wherein the renewable power generation system comprises at least one of a solar array or a wind turbine.

6. A modular charging station according to claim 1, further comprising:
   a second charging station positioned along an outer surface of the main chassis body; and
   a second charging system positioned on a third movable sub-chassis disposed within the main chassis body and electrically connected to the second charging station interface, the battery bank, and the power management system.

7. A modular charging station according to claim 6, wherein:
   the first charging station comprises at least one of a Level 2 or Level 3 charging station; and
   the second charging station comprises a Level 1 charging station.

8. A modular charging station according to claim 6, further comprising a second battery bank positioned on a fourth movable sub-chassis disposed within the main chassis body and electrically connected to the input power terminal and the second charging station.

9. A modular charging station according to claim 6, wherein the power management system is configured to load share charging capacity between each charging station.

10. A modular charging station according to claim 1, wherein:
    the charging station is connected to two charging cables; and
    the power management system is configured to allow the charging station to charge two vehicles simultaneously.

11. A modular charging station according to claim 1, wherein the power management system is positioned on a third movable sub-chassis.

12. A modular charging station according to claim 1, further comprising a mobile application interface configured to allow a user to interact with the charging station.

13. A modular charging station according to claim 1, wherein:
the main chassis body further comprises:
a first set of rails positioned along a floor of the main chassis body and aligned with a first access door; and
a second set of rails positioned along a floor of the main chassis body and aligned with a second access door;
the first movable sub-chassis comprises a set of wheels arranged to engage the first set of rails; and
the second movable sub-chassis comprises a second set of wheels arranged to engage the second set of rails.

14. A modular charging station according to claim 1, wherein:
the first movable sub-chassis is mounted to a first slidable track positioned along a floor of the main chassis body and aligned with a first access door, wherein the first slidable track is configured to extend outwardly through the first access door; and
the second movable sub-chassis is mounted to a second slidable track positioned along a floor of the main chassis body and aligned with a second access door, wherein the second slidable track is configured to extend outwardly through the second access door.

15. A modular charging station according to claim 1, wherein the first and second movable sub-chassis are mounted to a slidable track positioned along a floor of the main chassis body and aligned with an access door.

16. A modular charging station, comprising:
a main chassis body, comprising:
a first charging station interface positioned along an outer surface of the main chassis body;
a second charging station interface positioned along an outer surface of the main chassis body; and
an input power terminal;
a first charging station positioned on a first movable sub-chassis disposed within the main chassis body and electrically connected to the first charging station interface;
a second charging station positioned on a second movable sub-chassis disposed within the main chassis body and electrically connected to the second charging station interface;
a battery bank positioned on a third movable sub-chassis disposed within the main chassis body and electrically connected to the input power terminal and the first and second charging stations;
a renewable power generation system connected to an outside surface of the main chassis body and electrically connected to the battery bank via the input power terminal; and
a power management system disposed within the main chassis body and electrically connected to the first and second charging systems and the battery bank.

17. A modular charging station according to claim 16, wherein:
the first charging station comprises one of a Level 2 or Level 3 charging station; and
the second charging station comprises a Level 1 charging station.

18. A modular charging station according to claim 16, wherein the renewable power generation system comprises at least one of a solar array or a wind turbine.

19. A modular charging station according to claim 16, wherein the input power terminal is further configured to be connected to an electrical source connected to an electric power grid.

20. A modular charging station according to claim 16, wherein:
the main chassis body further comprises:
a first set of rails positioned along a floor of the main chassis body and aligned with a first access door; and
a second set of rails positioned along a floor of the main chassis body and aligned with a second access door;
the first movable sub-chassis comprises a set of wheels arranged to engage the first set of rails; and
the second movable sub-chassis comprises a second set of wheels arranged to engage the second set of rails.

* * * * *